United States Patent
Wicks et al.

Patent Number: 5,966,068
Date of Patent: Oct. 12, 1999

[54] PAGER AND PAGING SYSTEM FOR TRAVELERS

[75] Inventors: James E. Wicks, San Francisco, Calif.; David Fine, Riverdale, N.Y.

[73] Assignees: Sony Corporation, Tokyo, Japan; Sony Electronics, Inc., Park Ridge, N.J.

[21] Appl. No.: 08/820,655

[22] Filed: Mar. 18, 1997

[51] Int. Cl.$^6$ .................................................. G08B 00/00
[52] U.S. Cl. .............................. 340/286.01; 340/286.09; 340/311.1; 340/825.44; 340/905; 340/993
[58] Field of Search ........................... 340/286.01, 311.1, 340/309.15, 825.44, 313, 825.55, 905, 286.08, 286.09, 992, 993

[56] References Cited

U.S. PATENT DOCUMENTS

| | | | |
|---|---|---|---|
| 4,415,065 | 11/1983 | Sandstedt | 705/34 |
| 4,951,039 | 8/1990 | Schwendeman et al. | 345/473 |
| 5,131,020 | 7/1992 | Liebesny et al. | 379/59 |
| 5,173,688 | 12/1992 | DeLuca et al. | 340/825.44 |
| 5,243,529 | 9/1993 | Kashiwazaki | 340/994 |
| 5,331,431 | 7/1994 | Jasinski | 358/462 |
| 5,377,258 | 12/1994 | Bro | 379/93 |
| 5,446,678 | 8/1995 | Saltzstein et al. | 395/200.76 |
| 5,452,356 | 9/1995 | Albert | 365/221 |
| 5,465,082 | 11/1995 | Chaco | 340/825.54 |
| 5,481,255 | 1/1996 | Albert et al. | 340/825.55 |
| 5,491,785 | 2/1996 | Robson et al. | 395/162 |
| 5,495,344 | 2/1996 | Callaway, Jr. et al. | 358/407 |
| 5,508,695 | 4/1996 | Nelson et al. | 340/825.37 |
| 5,535,428 | 7/1996 | King et al. | 455/38.4 |
| 5,596,994 | 1/1997 | Bro | 128/732 |
| 5,623,242 | 4/1997 | Dawson, Jr. et al. | 340/311.1 |
| 5,635,918 | 6/1997 | Tett | 340/825.52 |
| 5,649,289 | 7/1997 | Wang et al. | 455/31.3 |

*Primary Examiner*—Edward Lefkowitz
*Assistant Examiner*—Davetta Woods
*Attorney, Agent, or Firm*—Ronald P. Kananen; Rader, Fishman & Grauer

[57] ABSTRACT

A novel pager and paging system assist a traveler, particularly a business traveler, with itinerary reminders and information regarding local services that is coordinated to the place and time of the items on the traveler's schedule. The paging system includes a database of the traveler's itinerary information and a database of information regarding locally available services. Items from the itinerary database are matched with similarly located or related services and transmitted to the traveler's pager in a timely manner to remind the traveler of his or her schedule and commitments.

18 Claims, 3 Drawing Sheets

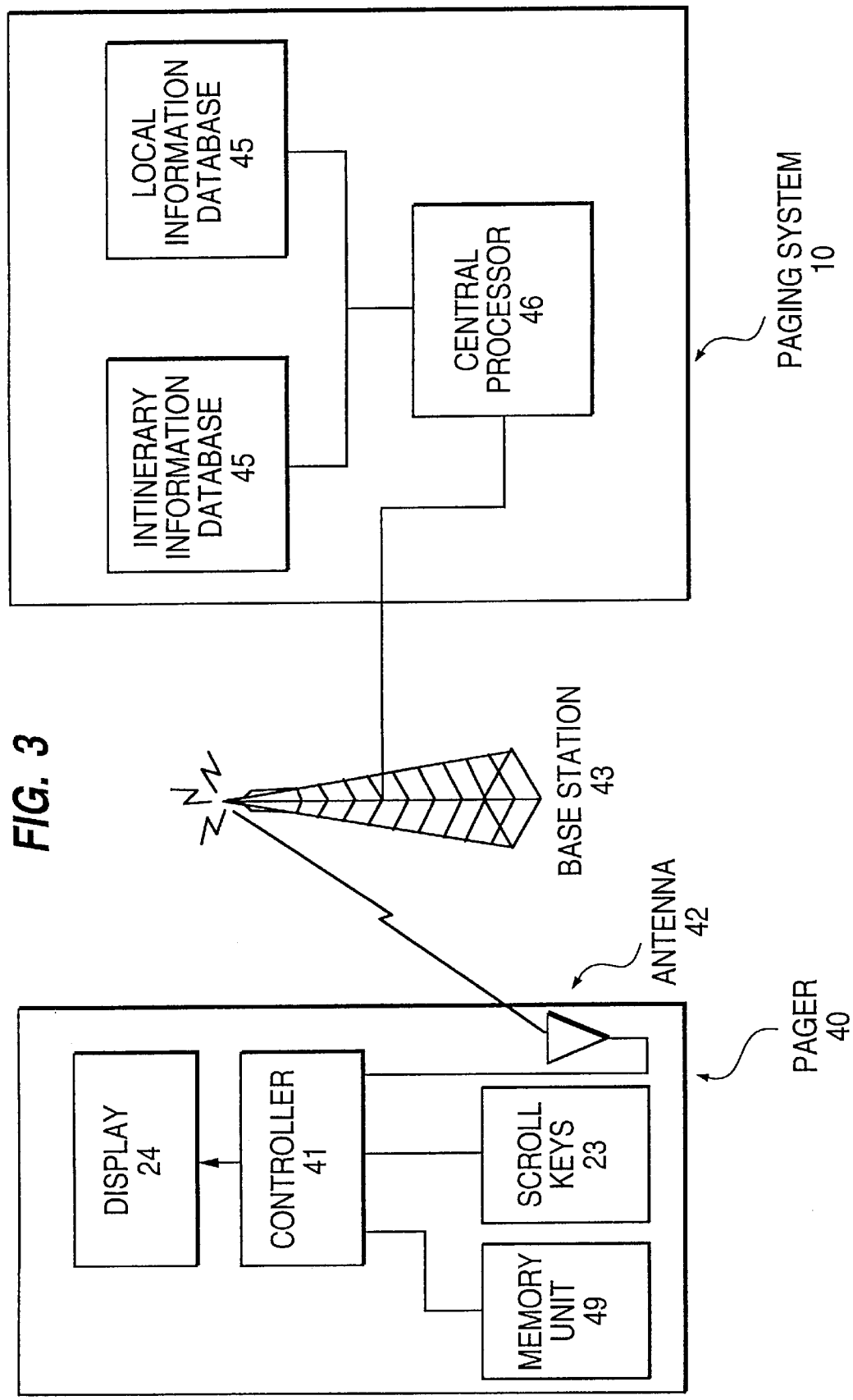

PAGER AND PAGING SYSTEM FOR TRAVELERS

FIELD OF THE INVENTION

The present invention relates generally to the field of wireless pagers. More particularly, the present invention relates to the application of wireless pager technology to the task of providing information for business travelers and tourists unfamiliar with an area.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contract with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but may have the capability to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information and communication demands of pager users.

Pagers are of particular value because of their ability to receive communications from any location within the service area at any time. Accordingly, pager users are often business people who keep exhausting meeting schedules with a variety of clients. The logistical problems associated with conducting such business are multiplied when the businessperson is traveling and in an unfamiliar area for a client meeting.

When traveling to an unfamiliar area, a businessperson may often find it difficult to get basic information about the area when and where needed. Accordingly, there is a need to for a way to adapt pager technology to assist business travelers in maintaining an itinerary and obtaining needed information about an unfamiliar area.

SUMMARY OF THE INVENTION

It is an object of the present invention to meet the above-identified needs and others. Particularly, it is an object of the present invention to provide a pager technology in which a pager user can use a pager to receive itinerary reminders, directions and other needed information while in an unfamiliar area.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a paging system including: a central processor; an itinerary database containing itinerary information for at least one person; and at least one transmitter for transmitting data to a pager. The processor accesses the itinerary database and transmits data to a pager based on the itinerary information. The data comprises information regarding an item of the itinerary information, and the transmission is timed so as to serve a reminder of the item.

The paging system of the present invention may further include a local information database containing information about services available within a service area of the paging system. The processor may match the itinerary information with information from the local information database and transmit the matched information to the pager. The processor may match information from the itinerary information database and the local information database on the basis of location, time or the preferences of a person which are recorded in the itinerary database.

The paging system of the present invention may further include a pager having: a controller, a display driven by the controller; a memory unit connected to the controller; an input device connected to the controller; and an antenna for receiving transmissions from the at least one transmitter. The transmissions from the at least one transmitter are stored in the memory unit and may be retrieved and displayed on the display in response to input from the input device.

The present invention also encompasses a method of using a paging system including the steps of: providing a central processor; compiling an itinerary database containing itinerary information for at least one person; accessing the itinerary database with the processor; and transmitting data based on the itinerary information to a pager with at least one transmitter. The step of transmitting is timed so as to serve a reminder of an item of the itinerary information.

The method of the present invention may further include the steps of: compiling a local information database containing information about services available within a service area of the paging system; and matching the itinerary information with information from the local information database using the processor. The step of transmitting comprises transmitting the matched information to the pager. The step of matching information from the itinerary information database and the local information database comprises the step of matching the information on the basis of location, time, or the preferences of a person which are recorded in the itinerary database.

Finally, the method of the present invention may continue with the steps of: providing a pager; receiving the transmissions with an antenna of the pager; storing the transmissions in a memory unit of the pager; inputting data to an input device of the pager; and displaying the transmission stored in the memory unit in response to the step of inputting data.

BRIEF DESCRIPTION OF THE DRAWINGS

The accompanying drawings illustrate the present invention and are a part of the specification. Together with the following description, the drawings demonstrate and explain the principles of the present invention. In the drawings:

FIG. 3 is a diagram of the components of the pager and paging system according to the present invention.

DETAILED DESCRIPTION OF THE PREFERRED EMBODIMENT

Figure 1:
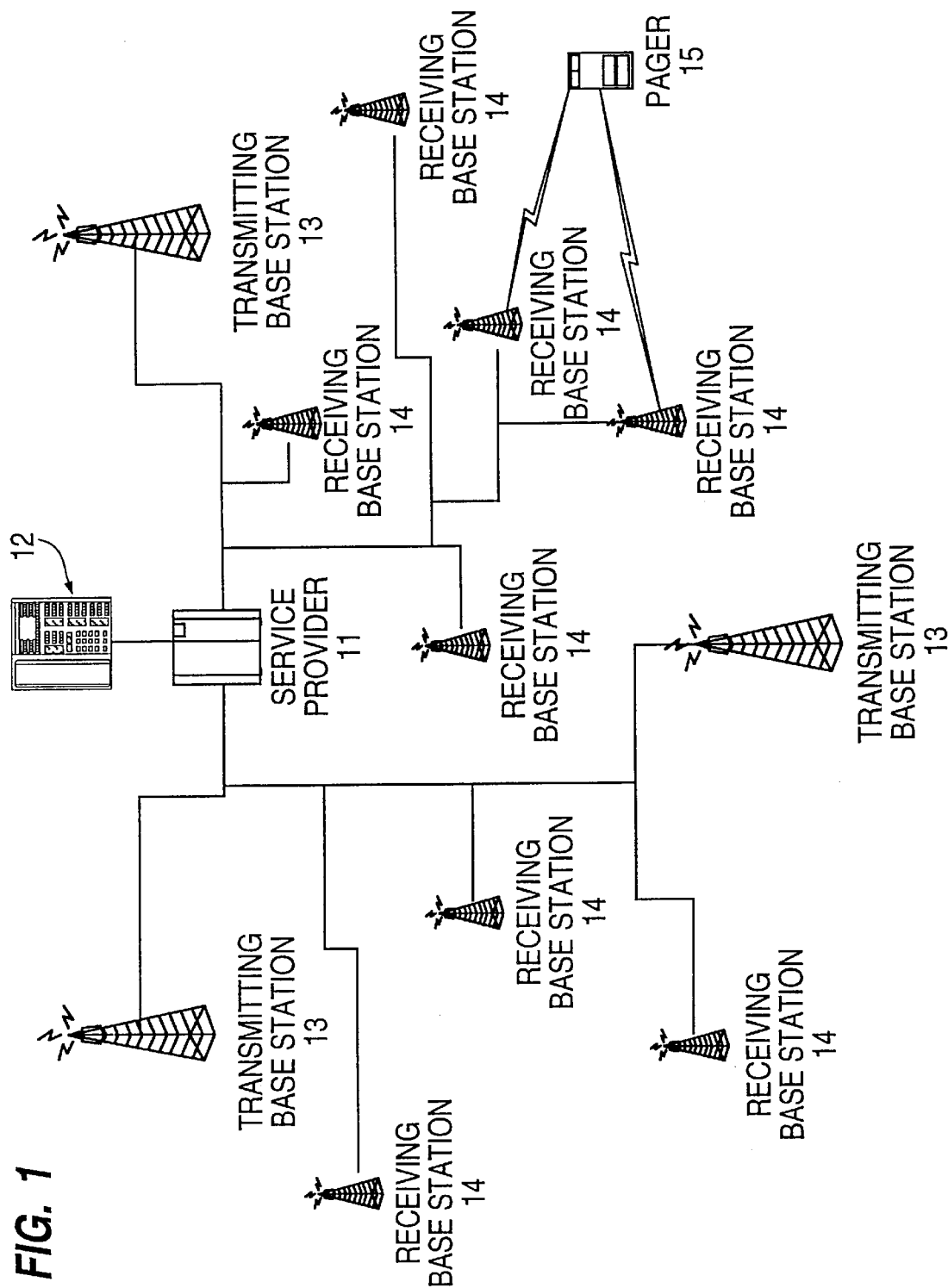
FIG. 1 is a schematic diagram of a conventional two-way paging network with which the present invention may be practiced.

Using the drawings, the preferred embodiment of the present invention will now be described.

As explained above, a paging system can provide either one- or two-way paging. While the principles of the present invention could certainly be used with a two-way paging system, in the preferred embodiment, a less expensive one-way system is employed.

FIG. 3 illustrates a one-way pager 40 and paging system 10 according to the principles of the present invention. The paging system 10 is provided with an itinerary information database 45, a local information database 48, and a central processor 46.

The itinerary information database 45 will contain itinerary information for pager users, particularly business travelers who are unfamiliar with the area. For example, the itinerary information may include: airport and flight information; rental car information; hotel address and reservation location; confirmation numbers; client meeting information including names, addresses, times, phone numbers, etc.; and information about any other scheduled engagements. The itinerary information may further include information about the traveler's preferences in food and entertainment.

The local information database 48 will contain information about services available throughout the area. For example, the information in database 48 may include: locations where cash or other banking services will be available to the business traveler; the location of available fax, computer, typing, internet and teleconference services; the location of cleaning or tailoring services; and the location of restaurants, entertainment, etc.

The central processor 46 of the paging system 10 monitors the itinerary information database 45. At appropriate times, the processor 46 will transmit a reminder for an event on a traveler's itinerary. The reminder may include an address, directions, a phone number, a confirmation number, etc.

The reminder, transmitted via base station 43, is received by pager 40. The pager 40 then alerts the traveler that a message has been received with either a vibratory or audible alert signal. The reminder is then displayed on display 24. The central processor 46 will transmit such reminders sufficiently in advance of the indicated appointment so that the traveler whose itinerary is being referenced can arrange to stay on schedule.

Additionally, the central processor 46 may match the time and/or location of the appointment on the traveler's itinerary with the location of services using the information in the local information database. Information regarding available nearby services can then transmitted to the traveler's pager with the itinerary reminder.

Figure 2:
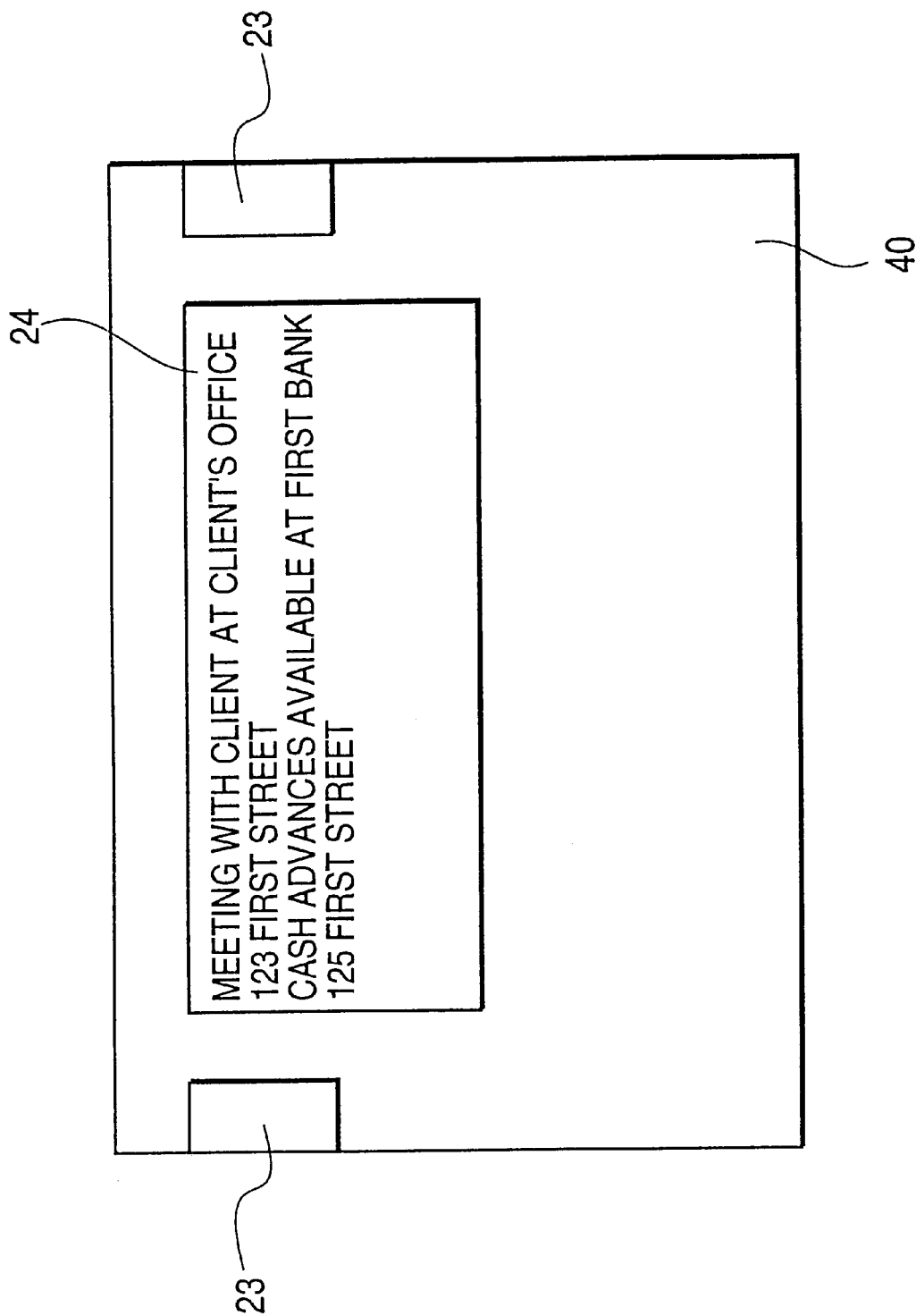
FIG. 2 is a diagram of a pager according to the principles of the present invention.

For example, as shown in FIG. 2, the central processor 46 may transmit a reminder of a client meeting, including the time and address. The message also includes a notice that the traveler may obtain a cash advance at a bank next door. If the itinerary reminder being transmitted is at or immediately preceding a meal time, the processor 46 may include information about restaurants near the appointment. Restaurant information may also be matched with the traveler's food preferences if such information regarding the traveler has been supplied to in itinerary database 48.

In the evenings, dinner reservation and entertainment information may be transmitted to the traveler's pager 40. Again such information may be matched against the traveler's preferences if available.

As shown in FIG. 3, pager 40 is also provided with a memory unit 49 and scroll keys 23. Information transmitted to pager 40 from the paging system 10 may be useful to the traveler, but not immediately so. Accordingly, pager 40 is equipped with memory unit 49 in which messages received from the paging system 10 are stored. Using scroll keys 23 provided on pager 40, the traveler can instruct the controller 41 to retrieve a message stored in memory unit 49. This allows the traveler to review information received earlier when that information is actually needed.

Due to the local nature of the information provided and the required familiarity with a traveler's itinerary, the present invention may best be practiced in conjunction with a hotel, airline, travel agency or other travel service provider who is hosting the traveler. Under the principles of the present invention, the hotel, travel agency, etc. with whom the traveler is associated may provide the traveler with the inexpensive, one-way pager of the present invention for the duration of the traveler's visit. For the convenience of the traveler, the pager of the present invention may be made small in size, e.g., credit card size, to facilitate its being carried by the traveler.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A paging system comprising:

a central processor;

an itinerary database containing itinerary information for at least one person; and at least one transmitter for transmitting data to a pager;

wherein said processor accesses said itinerary database and transmits data to a pager based on said itinerary information;

wherein said data comprises information regarding an item of said itinerary information, and said transmission is timed so as to serve as a reminder of said item.

2. A paging system as claimed in claim 1, further comprising:

a local information database containing information about services available within a service area of said paging system;

wherein said processor matches said itinerary information with information from said local information database and transmits said matched information to said pager.

3. A paging system as claimed in claim 2, wherein said processor matches information from said itinerary information database and said local information database on the basis of location of said services.

4. A paging system as claimed in claim 2, wherein said processor matches information from said itinerary information database and said local information database on the basis of a timing of said item of itinerary information.

5. A paging system as claimed in claim 2, wherein said processor matches information from said itinerary information database and said local information database on the basis of preferences of said person which are recorded in said itinerary database.

6. A paging system as claimed in claim 1, further comprising a pager having:

a controller;

a display driven by said controller;

a memory unit connected to said controller;

an input device connected to said controller; and an antenna for receiving transmissions from said at least one transmitter;

wherein said transmissions from said at least one transmitter are stored in said memory unit and may be retrieved and displayed on said display in response to input from said input device.

7. A method of using a paging system comprising the steps of:

providing a central processor;

compiling an itinerary database containing itinerary information for at least one person;

accessing said itinerary database with said processor; and transmitting data based on said itinerary information to a pager with at least one transmitter;

wherein said step of transmitting is timed so as to serve as a reminder of an item of said itinerary information.

8. A method as claimed in claim 7, further comprising the steps of:

compiling a local information database containing information about services available within a service area of said paging system; and matching said itinerary information with information from said local information database using said processor;

wherein said step of transmitting comprises transmitting said matched information to said pager.

9. A method as claimed in claim 8, wherein said step of matching information from said itinerary information database and said local information database comprises the step of matching said information on the basis of location of said services.

10. A method as claimed in claim 8, wherein said step of matching information from said itinerary information database and said local information database comprises the step of matching said information on the basis of local information database on the basis of a timing of said item of itinerary information.

11. A method as claimed in claim 8, wherein said step of matching information from said itinerary information database and said local information database comprises the step of matching said information on the basis of preferences of said person which are recorded in said itinerary database.

12. A method as claimed in claim 7, further comprising the steps of:

providing a pager;

receiving said transmissions with an antenna of said pager;

storing said transmissions in a memory unit of said pager;

inputting data to an input device of said pager; and displaying said transmission stored in said memory unit in response to said step of inputting data.

13. A paging system as claimed in claim 1, wherein said itinerary information includes at least one of airport information, flight information, rental car information, hotel information, a reservation confirmation number, engagement or meeting information, client contact information, food preferences, or entertainment preferences.

14. A method as claimed in claim 7, wherein said itinerary information includes at least one of airport information, flight information, rental car information, hotel information, a reservation confirmation number, engagement or meeting information, client contact information, food preferences, or entertainment preferences.

15. A paging system comprising:

a central processor;

a business and recreational travel itinerary database containing travel itinerary information for at least one person; and at least one transmitter for transmitting data to a pager;

wherein said processor accesses said travel itinerary database and transmits data to a pager based on said travel itinerary information;

wherein said data comprises information regarding an item of said travel itinerary information, and said transmission is timed so as to serve as a reminder of said item.

16. A method of using a paging system comprising the steps of:

providing a central processor;

compiling a business and recreational travel itinerary database containing travel itinerary information for at least one person;

accessing said travel itinerary database with said processor; and transmitting data based on said travel itinerary information to a pager with at least one transmitter;

wherein said step of transmitting is timed so as to serve as a reminder of an item of said travel itinerary information.

17. A paging system as claimed in claim 2, wherein said services comprise at least one of banking services, faxing services, typing services, computer services, internet access services, teleconferencing services, cleaning services, tailoring services, entertainment services, or restaurant services.

18. A method as claimed in claim 8, wherein said services comprise at least one of banking services, faxing services, typing services, computer services, internet access services, teleconferencing services, cleaning services, tailoring services, entertainment services, or restaurant services.

* * * * *